United States Patent [19]
Arii et al.

[11] Patent Number: 5,382,776
[45] Date of Patent: * Jan. 17, 1995

[54] COMBINATION OF AN OPTICAL-DISK AND BARCODE MEMORY MEDIUM FOR USE WITH AN OPTICAL DISK PLAYBACK APPARATUS, HAVING CONTROL PROGRAMS STORED IN THE OPTICAL-DISK AND SPECIFIED BY BARCODES STORED IN THE BARCODE MEMORY MEDIUM

[75] Inventors: Kouji Arii, Takatsuki; Testsuo Maeda, Neyagawa; Tetsuo Tomimoto, Ibaraki; Ryo Akiyama, Hirakata, all of Japan

[73] Assignee: Matsushita Electric Industrial Co., Ltd., Osaka, Japan

[*] Notice: The portion of the term of this patent subsequent to Oct. 5, 2010 has been disclaimed.

[21] Appl. No.: 54,272

[22] Filed: Apr. 30, 1993

Related U.S. Application Data

[63] Continuation of Ser. No. 406,281, Sep. 12, 1989, Pat. No. 5,250,787.

[30] Foreign Application Priority Data

Sep. 14, 1988 [JP] Japan ................ 63-230413
Mar. 29, 1989 [JP] Japan ................ 1-078842

[51] Int. Cl.⁶ ............ G11B 27/28; G06K 7/10
[52] U.S. Cl. .................. 235/375; 369/47; 358/335
[58] Field of Search ............ 235/375, 419, 462, 472; 369/32, 47, 48, 59, 275.3; 358/335

[56] References Cited

U.S. PATENT DOCUMENTS

| | | | |
|---|---|---|---|
| 4,481,412 | 11/1984 | Fields . | |
| 4,766,581 | 8/1988 | Korn et al. | 235/381 |
| 4,825,419 | 4/1989 | Ohtomo | 369/47 |
| 4,831,610 | 5/1989 | Hoda et al. | 235/472 |

FOREIGN PATENT DOCUMENTS

| | | |
|---|---|---|
| 61-16684 | 1/1986 | Japan . |
| 2201028 | 8/1988 | United Kingdom . |
| 8302839 | 8/1983 | WIPO . |
| 8604720 | 8/1986 | WIPO . |

*Primary Examiner*—Robert A. Weinhardt
*Attorney, Agent, or Firm*—Stevens, Davis, Miller & Mosher

[57] ABSTRACT

An optical-disk playback apparatus plays back an optical-disk on which control programs defining the operations of the optical-disk playback apparatus and other information are recorded. Such optical-disk playback apparatus is operable by a combination of an optical-disk, such as a laser disk or CD, and printed materials on which barcodes are printed. Predetermined programs are recorded defining the operation of the optical-disk playback apparatus corresponding to the barcodes. As a result, variable, complex and yet flexible optical-disk playback operations which are not fixed at the initial system designing stage can be accomplished by simply tracing the printed barcode. The operation of the optical-disk playback apparatus is controlled by the control programs recorded in the optical disk. Difficulties which might occur when an optical-disk and barcode of different systems are combined can be prevented since a one-to-one correspondence between the barcode and the optical disk code is established beforehand.

1 Claim, 10 Drawing Sheets

F I G. 1
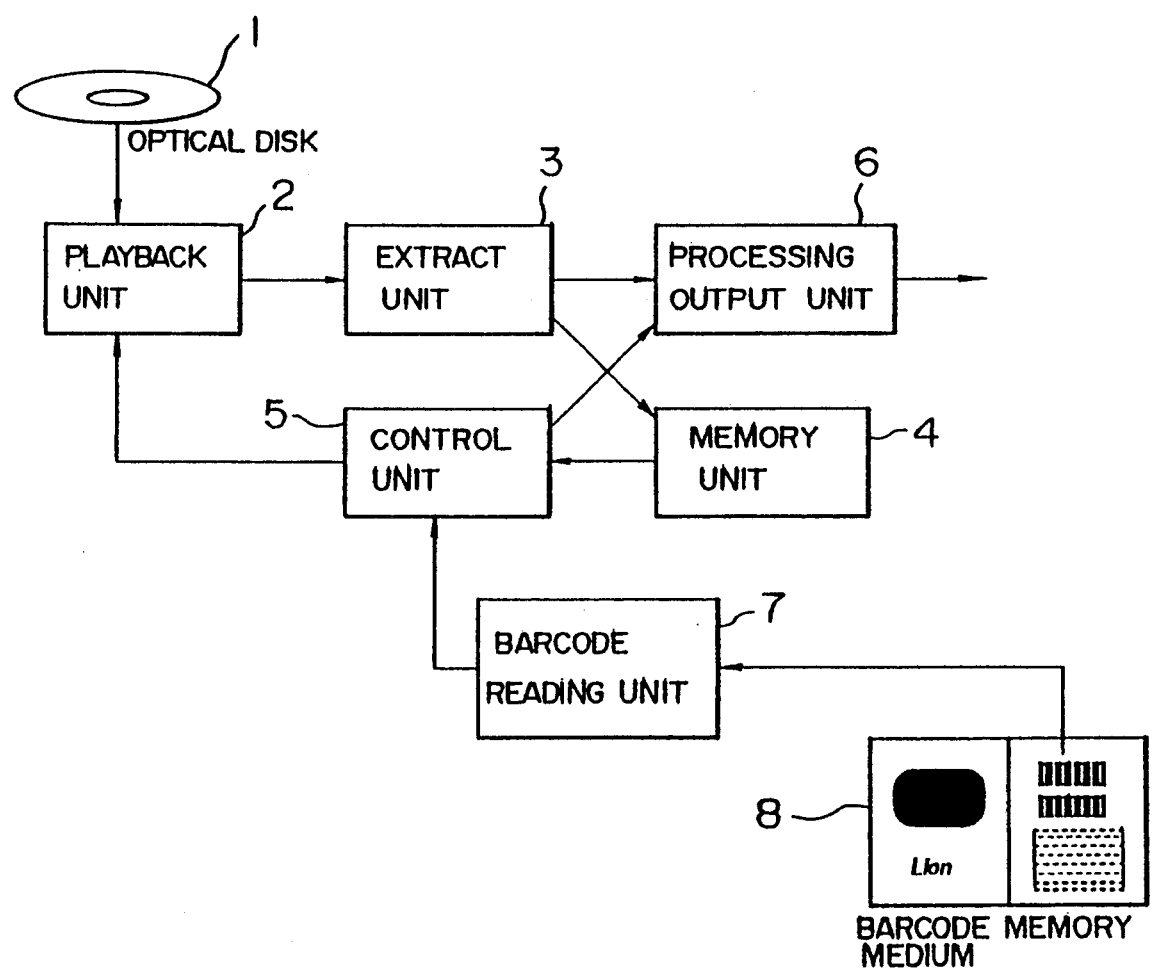

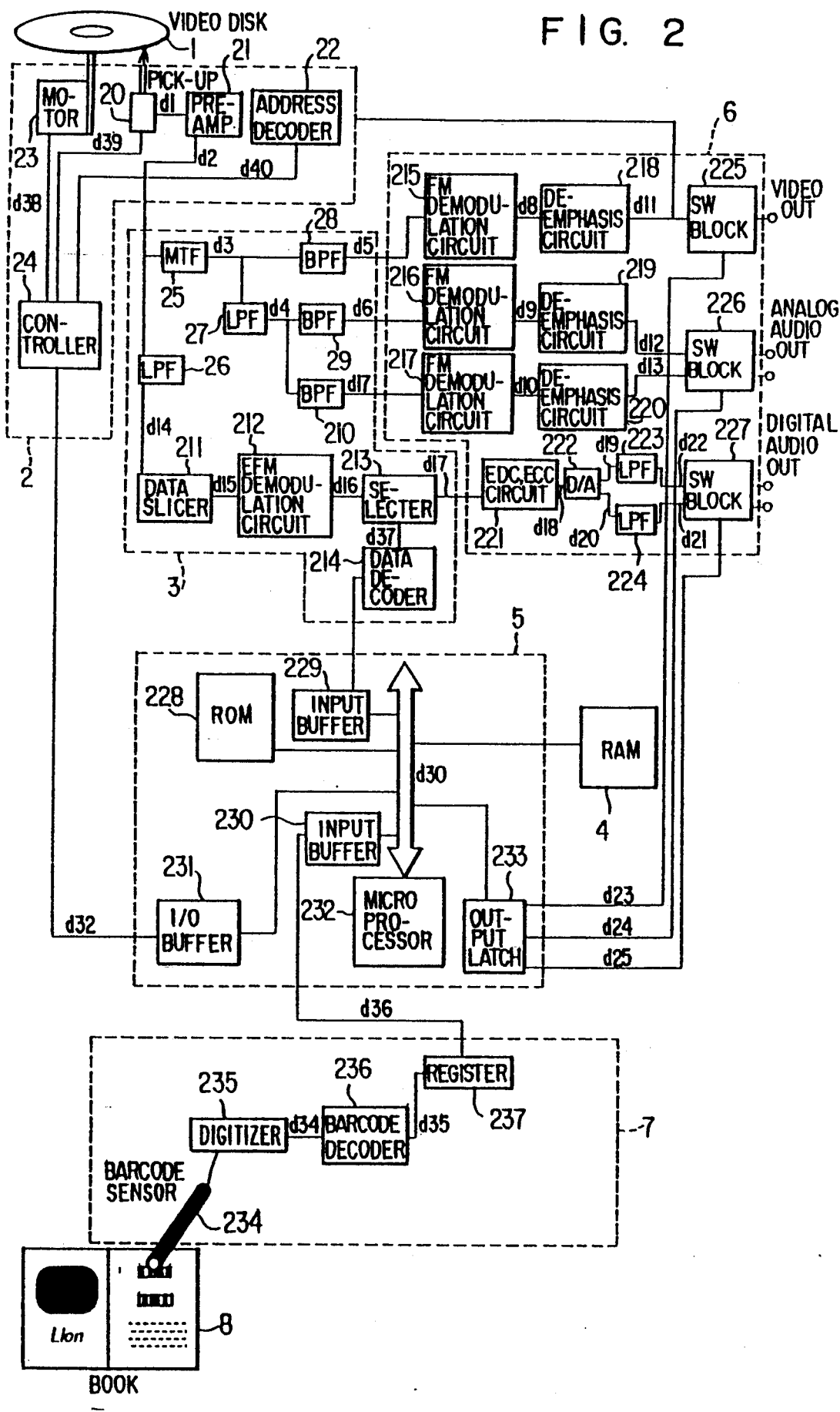

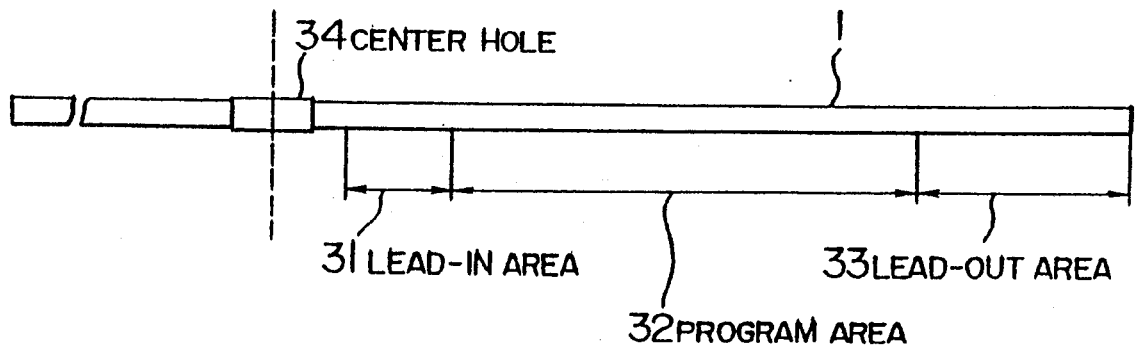
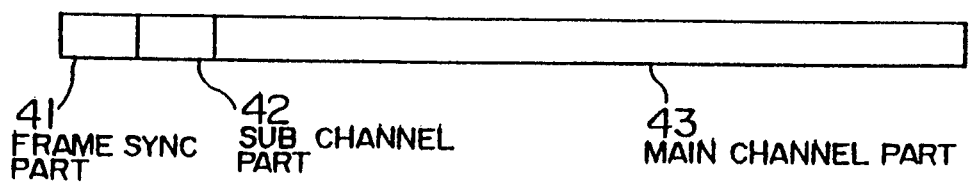
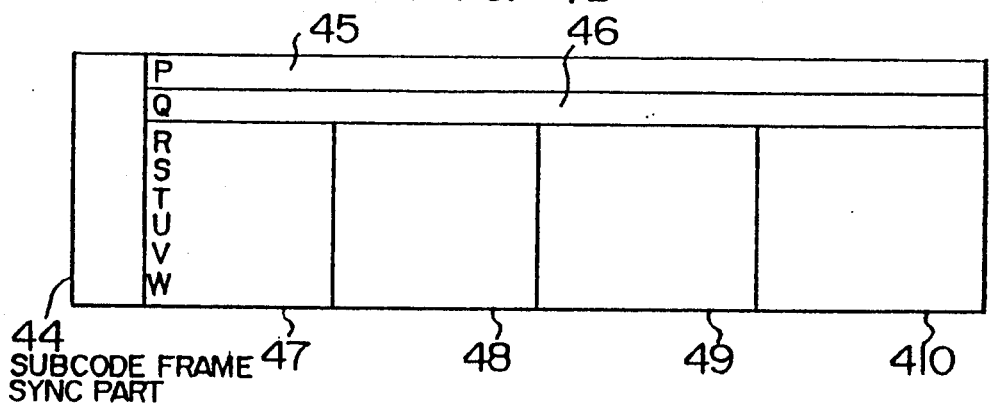
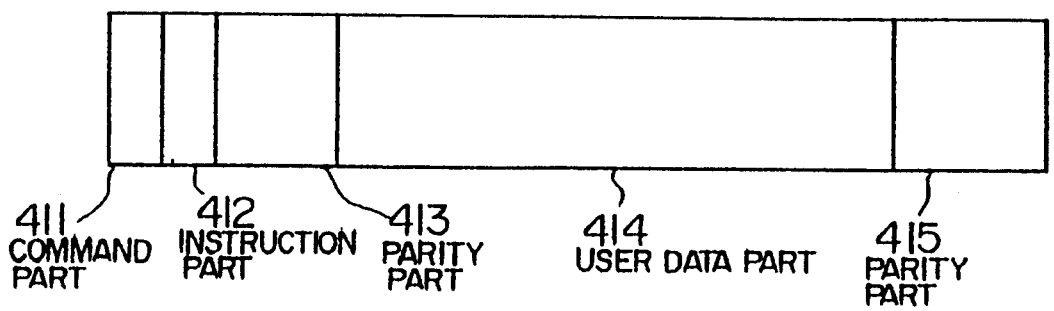

FIG. 5A
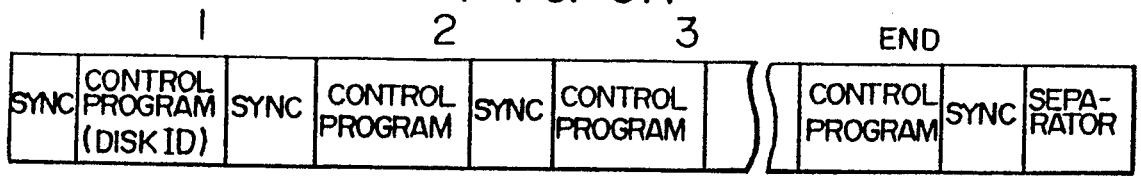
FIG. 5B
CONTROL PROGRAM (DISK ID)
| DISK ID CODE |
| --- |
CONTROL PROGRAM
| OPERATION CODE | COMPOUND COMMAND |
| --- | --- |
FIG. 5C
COMPOUND COMMAND
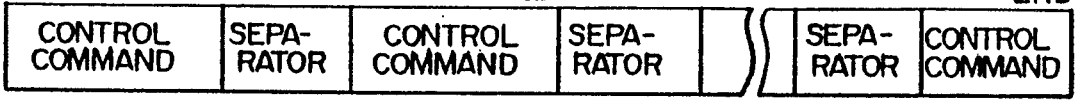
FIG. 5D
CONTROL COMMAND (0 FRAME TYPE)
| CONTROL CODE | ATTRIBUTE CODE |
| --- | --- |
CONTROL COMMAND (1 FRAME TYPE)
| CONTROL CODE | ATTRIBUTE CODE | FRAME CODE |
| --- | --- | --- |
CONTROL COMMAND (2 FRAME TYPE)
| CONTROL CODE | ATTRIBUTE CODE | FRAME CODE | FRAME CODE |
| --- | --- | --- | --- |

FIG. 5E

| | 0 1 2 3 4 5 6 7 | 8 9 10 11 12 13 14 15 | |
|---|---|---|---|
| 1 BYTE | SYNC CODE | DISK ID CODE | |
| 3 BYTE | DISK ID CODE | SYNC CODE | |
| 5 BYTE | OPERATION CODE | OPERATION CODE | PACK 1 |
| 7 BYTE | CONTROL CODE | ATTRIBUTE CODE | |
| 9 BYTE | FRAME CODE | FRAME CODE | |
| 11 BYTE | FRAME CODE | FRAME CODE | |

| | 0 1 2 3 4 5 6 7 | 8 9 10 11 12 13 14 15 | |
|---|---|---|---|
| 13 BYTE | SEPARATOR CODE | CONTROL CODE | |
| 15 BYTE | ATTRIBUTE CODE | FRAME CODE | |
| 17 BYTE | FRAME CODE | SEPARATOR CODE | PACK 2 |
| 19 BYTE | CONTROL CODE | ATTRIBUTE CODE | |
| 21 BYTE | SYNC CODE | OPERATION CODE | |
| 23 BYTE | OPERATION CODE | CONTROL CODE | |

| | 0 1 2 3 4 5 6 7 | 8 9 10 11 12 13 14 15 | |
|---|---|---|---|
| (12n+1) BYTE | SYNC CODE | OPERATION CODE | |
| (12n+3) BYTE | OPERATION CODE | CONTROL CODE | |
| (12n+5) BYTE | ATTRIBUTE CODE | FRAME CODE | |
| (12n+7) BYTE | FRAME CODE | FRAME CODE | PACK n |
| (12n+9) BYTE | FRAME CODE | SYNC CODE | |
| (12n+11) BYTE | SEPARATOR CODE | | |

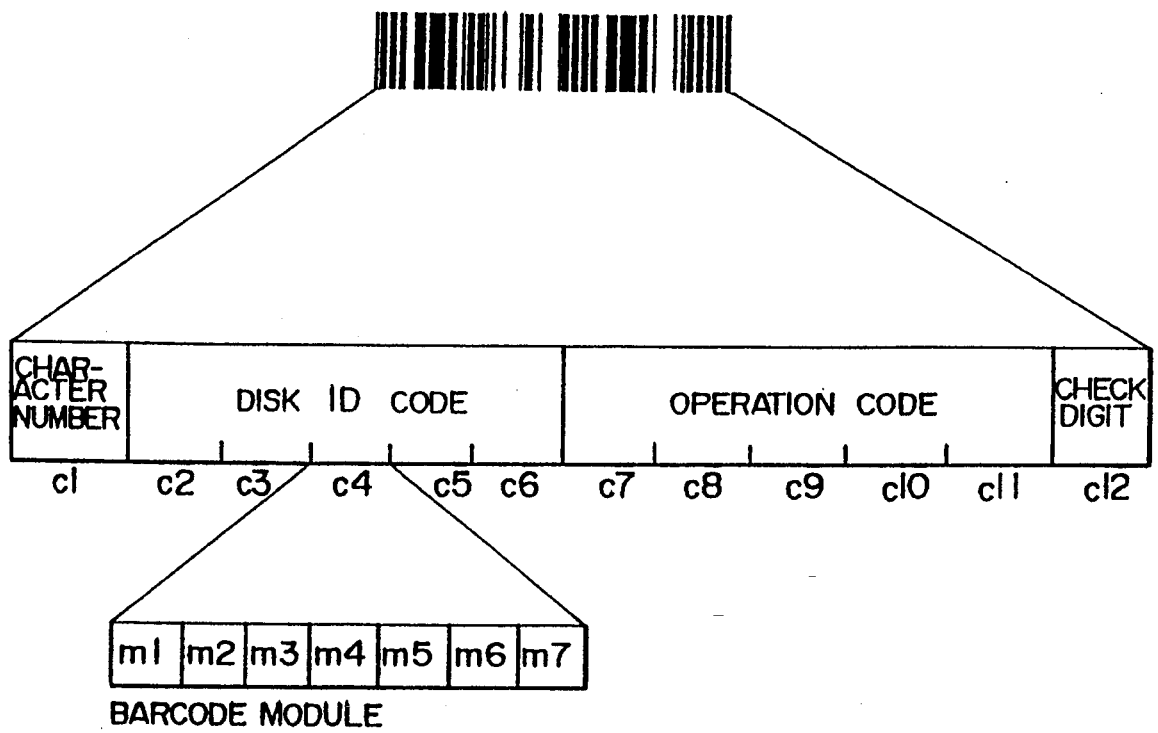

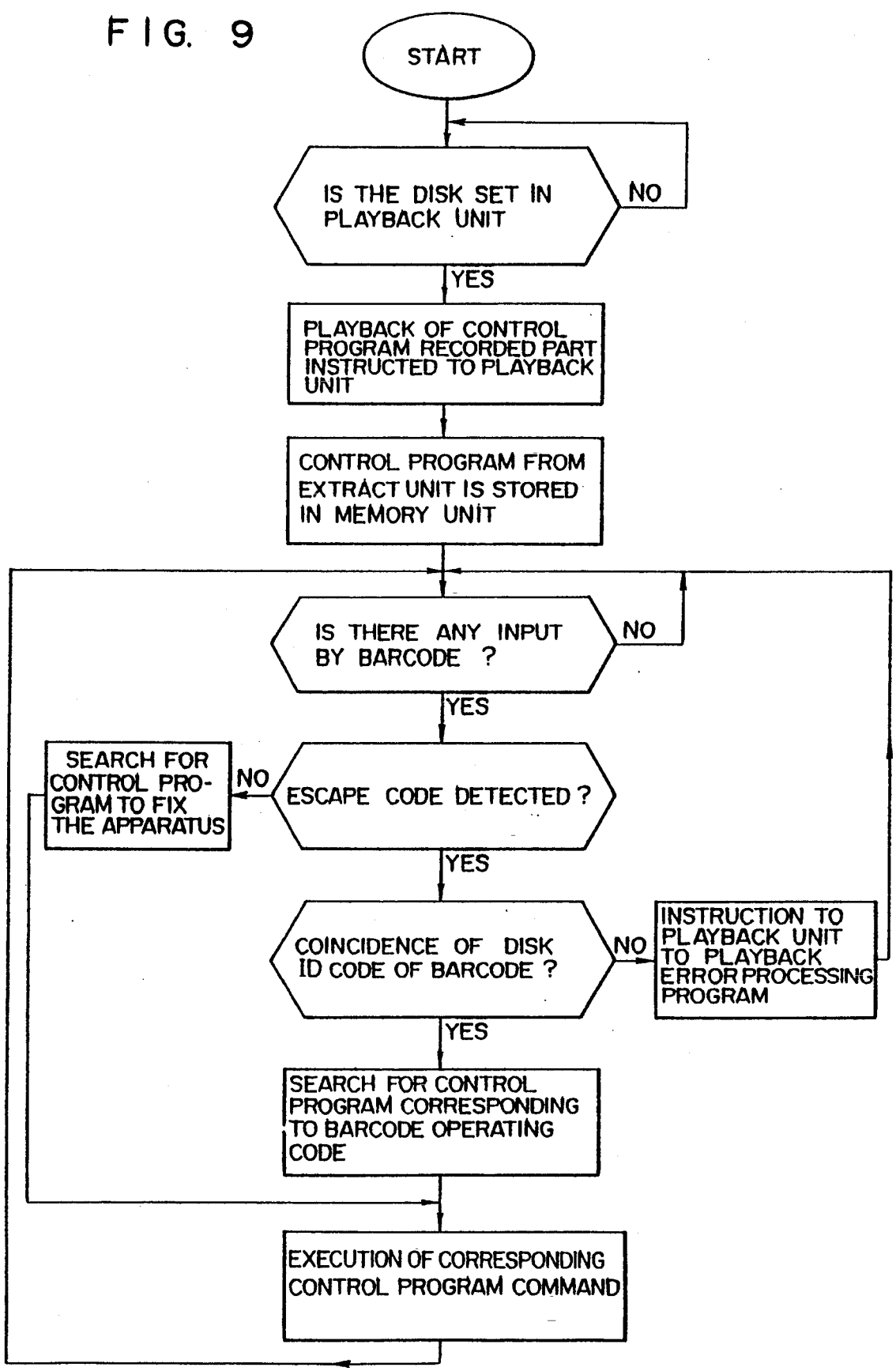

COMBINATION OF AN OPTICAL-DISK AND BARCODE MEMORY MEDIUM FOR USE WITH AN OPTICAL DISK PLAYBACK APPARATUS, HAVING CONTROL PROGRAMS STORED IN THE OPTICAL-DISK AND SPECIFIED BY BARCODES STORED IN THE BARCODE MEMORY MEDIUM

This is a continuation of application Ser. No. 07/406,281 filed Sep. 12, 1989 now U.S. Pat. No. 5,250,787.

BACKGROUND OF THE INVENTION

This invention is related to an optical-disk playback apparatus capable of selective playback of desired information from an optical-disk on which information is prerecorded. As utilization of optical-disks such as the compact-disc and laser-disk on which video and audio information is recorded have become wide spread recently, demands for higher degrees of usage such as the random access functions are increasing as well as requirements for higher picture and audio qualities. However, instead of complicated conventional search methods using ten-keys and search buttons, a simpler and more convenient search method operable by any operator is considered essential.

As one of such search methods, an interactive video training system with barcode disclosed by U.S. Pat. No. 4,481,412 had been known. In this system, video-disks on which various training materials are recorded are used together with a content table identifying the titles of training material and the workbook carrying barcodes of said titles. This system consists of a barcode reader to read the barcode, video-disk player to play the training material recorded in said video-disk, and a microcontroller to control the video-disk player according to the input from the barcode reader. The operator can indicate the type of desired information to said system by reading the barcode printed in the workbook. The microcontroller interprets the input barcodes and outputs a control signal to the video-disk player to output desired information. The video-disk, upon receiving said control signal, outputs the desired information. By using this system, the operator can retrieve the desired information from said video-disk simply by tracing the printed barcode by a barcode reader.

However, this system includes the following problems. First, since the video-disk operations corresponding to each of the barcodes is determined by the microcontroller incorporated in the system, the types of function attainable by the barcode are set unchangeably at its designing stage. For example, if a barcode was assigned to reproduce a specific section of the video-disk, this barcode can not be assigned to reproduce more than one section of the video-disk if it was desired at a later stage. Furthermore, since the video-disk operation corresponding to each barcode is determined by the microcontroller, the microcontroller designed for use with one video-disk is uncompatible for use with the other video-disks depending on the cases. For example, a video-disk on which numerous training materials recorded in a unit of one minute is incompatible with video-disks on which training materials are prepared in a unit of 30 seconds. Therefore, the barcode must be prepared to have a universal application in order to be able to be used with various types of video-disk and workbooks, and for this, complicated and troublesome operations for retrieving a desired information become essential.

Moreover, if various video-disk functions common throughout these various video-disk systems such as the starting of play, pause, search, etc. are attempted to be standardized in terms of barcode system, one of these function barcodes has to be read first and then the barcodes for the information has to be read in every playback operation, making the operation more complicated. Furthermore, if barcodes compatible with a full range of possible sets of functions corresponding to plural video-disks and workbooks were attempted to be prepared, the numbers of possible functions would be almost infinite, and so the numbers of necessary barcodes also would be impossible to realize. Further, the microcontroller and its software designed for each barcode system has to be replaced every time when the type of video-disks and their associated workbooks are altered, and this is nearly an impossible task to carry out.

In addition, since the conversion of a barcode to a control information signal by a microcontroller is independent of information recorded on a video-disk, difficulties would occur when a correspondence is not established between the barcode and the video-disk. For example, if a video-disk with no correspondence to a barcode were inserted in a video-player to which a wrong instruction read by barcode-reader were given by mistake, an access to a non-recorded section on the disk, or an access to video or audio information undesired by the operator might take place.

SUMMARY OF THE INVENTION

The purpose of this invention is to solve the above described problems, that is, to realize a flexible optical-disk playback apparatus wherein functions attainable by each of the codes are not initially determined at its original designing stage, while still attaining complicated functions by tracing said codes by storing the control programs defining the operations of the optical-disk playback apparatus corresponding to each of the codes (such as those barcodes printed on printed materials). Furthermore, by establishing a one to one correspondence between the code and the optical-disk, errors which might occur due to an unmatched combination of optical-disk and code can be prevented. The optical-disk playback apparatus of this invention attaining the above described aims includes an optical-disk playback unit to playback an optical-disk to output recorded information, an extractor unit to extract control programs from the information output from said playback unit, memory unit a to store said control program output by said extractor unit, processing output unit a to process and output information other than said control programs among the information output from said playback unit, code reading unit a which reads said code out of a recording medium in which the code corresponding to a specific operation of said optical-disk is recorded and outputs the operation code converted from the read code, and a control unit which controls the playback unit or the processing unit according to a specific operation.

BRIEF DESCRIPTION OF THE DRAWINGS

FIG. 1 shows a block diagram of an embodiment of an optical disk playback apparatus of this invention;

FIG. 2 shows a detailed block diagram of the embodiment shown in FIG. 1;

FIG. 3 shows a cross-section of an optical-disk;

FIG. 4A shows a schematic diagram of an frame for an optical-disk;

FIG. 4B shows a schematic diagram of an sub-code frame;

FIG. 4C shows a schematic diagram of an optical-disk pack;

FIG. 5A is a schematic diagram of plural control programs;

FIG. 5B is a schematic of a diagram control program;

FIG. 5C is a schematic of diagram a compound command;

FIG. 5D is a schematic of diagram a control commands;

FIG. 5E is a schematic of control programs stored in the pack;

FIG. 7A shows a schematic diagram of data recorded in a form of a barcode;

FIG. 7B shows a barcode module correlations;

FIG. 9 is a flowchart showing the operations of a control unit of the second embodiment.

DESCRIPTION OF THE PREFERRED EMBODIMENTS

Figure 6A:
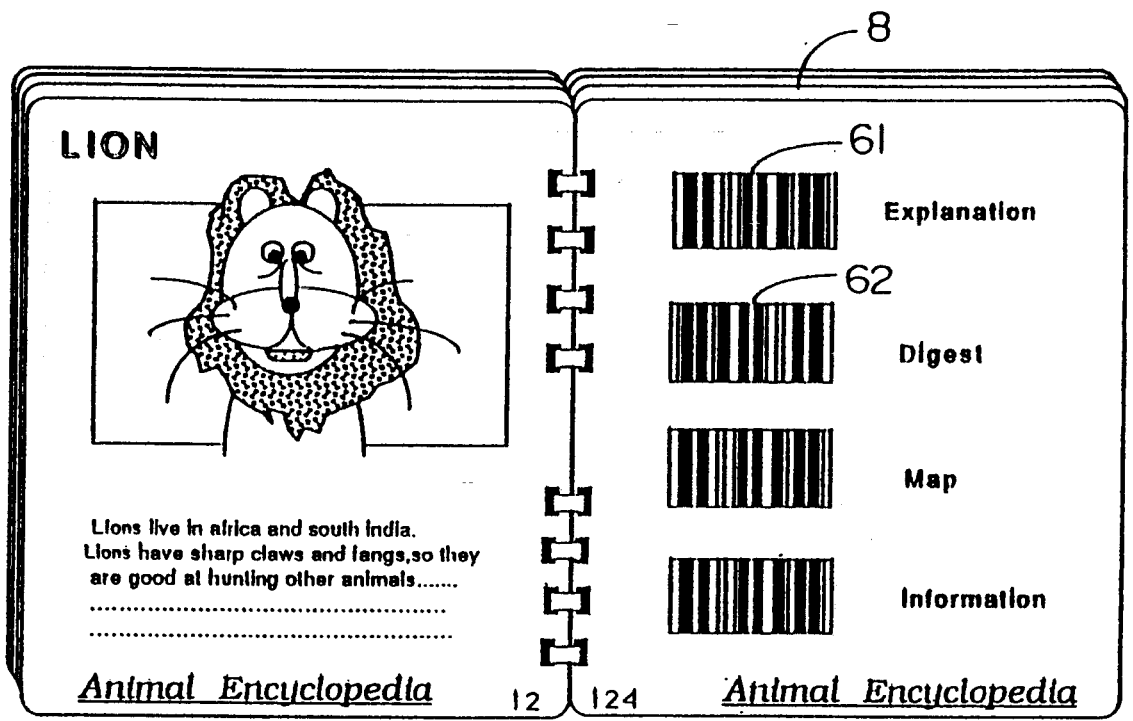
FIG. 6A shows a spread of a book on which barcodes of a first embodiment are printed.

The explanation of this optical-disk playback apparatus, the method of optical-disk playback and the combined recording medium are now described referring those drawings showing a first embodiment of the invention. This is an embodiment of which an optical-disk apparatus control program includes combined plural fixed fundamental commands employed by a conventional optical-disk playback apparatus.

FIG. 1 shows a block diagram of an optical-disk playback apparatus of the present invention where the numeral 1 is an optical-disk, 2 is a playback unit, 3 is an extract unit, 4 is a memory unit, 5 is a control unit, 6 is a processing output unit, 7 is a barcode reading unit, and 8 is a barcode memory medium.

The explanation of the optical-disk playback apparatus thus constituted is now described as follows. A plurality of control programs defining the operations of an optical-disk playback apparatus is recorded on the optical-disk 1, and the barcodes defining the operations of said optical-disk playback apparatus are printed on a barcode memory medium.

When an optical-disk 1 is set in this optical-disk playback apparatus, said control unit 5 derives an instruction to said playback unit 2 to playback the recording at an instructed location by means of plural control programs recorded on the optical-disk 1. Upon receiving said instruction, the playback unit 2 plays back the recording at said instructed location on the optical-disk 1, and the played back signal containing plural control programs are transferred to the extraction unit 3 where the extraction of plural control programs out of the played back signal is carried out for storing these in the memory unit 4.

Under this condition, the optical-disk playback apparatus is in a mode in which the barcodes corresponding to said optical-disk set in the apparatus and recorded on the barcode recording medium can be interpreted, and the playback of optical-disk 1 becomes possible by the barcode instruction input by an operator.

The following explain the concrete constituting elements of instructions, and this is begun with the data format of Optical-disk 1. In this embodiment of the optical-disk, a laser vision (LV) disk on which audio and video information are recorded is exemplified, and furthermore, a CAV laser disk of a constant rotating speed of 1800 rpm type among CAV and CLV type laser disks is explained here.

Analog video signals as the video information and both analog and digital audio signals as the audio information are recorded on said LV. The analog video signal is an NTSC video signal of which synchronizing chip is clamped at 7.6 MHz. Its white peak is set at 9.3 MHz, and it is FM modulated with its pedestal level set at 8 MHz. The analog audio signal of two channels are FM modulated at 2.3 and 2.8 MHz respectively. The band of the digital audio signal is limited below 2 MHz after EFM (Eight-to Fourteen) modulation of it is conducted. The EFM modulated digital audio signal, FM modulated analog video signal and FM modulated analog audio signals are frequency-division multiplexed for recording.

The digital audio signal is recorded by using a format which is the same as the one used for the compact-disc (CD) which is an optical disk on which only digital audio signals are recorded.

In this embodiment, the recording of plural control programs is made by time-division multiplexing on the sub-channel, and this, in turn, is to be recorded on the main channel for digital audio signals.

The digital audio data format for the optical-disk 1 on which said plural control programs are to be recorded is now explained referring to FIGS. 3 and 4. FIG. 3 is a cross-section of optical-disk 1 showing its construction. The center hole 34, lead-in part 31, the analog audio, digital audio signals, and program area 32 on which frequency multiplexed analog video signal is recorded: and a lead-out area 33 showing the end of the disk are arranged on the optical-disk from the disk center toward the outer rim. A schematic of a digital audio signal to be recorded on the optical-disk 1 is shown in FIG. 4 where FIG. 4A shows a schematic of a frame which is a minimum recording unit, FIG. 4B shows a schematic of a sub-code frame, and FIG. 4C shows a schematic of a pack.

The digital audio data is recorded on the disk at a rate of 7350 per second in an unit of frame shown in FIG. 4A. The unit frame consists of a sub-channel memory part 42 of one byte, main channel memory part 43 of 32 bytes, and a frame synchronization part 41.

The two channel audio data quantized by a sampling frequency of 44.1 kHz and quantization bit number of 16 bits are divided in every 24 byte as the main data before being recorded on the main channel memory part 43 together with the 8 byte error detecting and correcting code. A sub-data called sub-code of one byte is recorded on the sub-channel memory part 42, and each bit of said sub-code of one byte corresponds to the respective channels named P, Q, R, S, T, U, V, and W channels. This means that there exist eight sub-channels in the sub-channel memory part 42.

The sub-code frame is thus constituted in the sub-channel memory part 42 by the continuous 98 frames which are shown in FIG. 4B. The sub-code frame synchronization part 44 is constituted by the sub-channel memory part 42 corresponding to the first two frames, and the sub-channels of P to W channels are recorded in the sub-channel memory part 42 corresponding to the rest of the 96 frames.

The six sub-channels from R to W channels (hereinafter, referred to as R-W channels) are integratedly dealt. Six bits of R-W channels are called a symbol, and 96 symbol units constitute a packet.

Plural control programs are recorded in the packets located in the R-W channels, and by allocating the lead-in part 31 for a physical part on which the control programs are to be recorded, said plural control programs can be read before the playback of program part 32 of optical disk 1 is started. One packet is divided into 24 symbols, and packs 47, 48, 49, 410 are constituted of 24 symbols.

FIG. 4C shows a schematic diagram of pack comprised of the command part 411 of one symbol, instruction part 412 of one symbol, parity part 413 of two symbols, user-data part 414 of 16 symbols, and the parity part 415 of four symbols which are arranged from the top. The command part 411 is for defining the contents of recording within symbol, and the upper three bits in the command part are called mode bits, and the lower three bits are called item bits. The mode 0 (000) and item 0 (000) are called 0 mode, and all the symbols within the pack are 0s. Most conventional disks employ this mode. The mode 7 (111), item 0 (000) are defined to as the user mode which is used in the present embodiment. That is, the control programs are recorded in the pack the command part of which takes the mode 7.

The instruction part 412 is used as an identifier for the control programs recorded in the pack. The lower first bit of instruction part 412 is assigned to the initiation bit and the second bit is assigned to the termination bit. That is, 1 (000001) is recorded in the instruction part 412 of the first pack on which plural control programs are recorded, and 2 (000010) is recorded in the instruction part 412 of the last pack at which the recording of plural control programs is terminated. 0 (000000) is recorded in the instruction part 412 except those in the first and last packets.

If the recording of plural control programs is completed within one pack, 3 (000011) which gives 1s for both the initiation bit and termination bit is recorded in the instruction part 412 of the corresponding pack. The data to be recorded in the pack are dealt in a byte unit of 8 bits, and the data of 12 bytes are recorded in one pack.

As for the format of plural control programs, explanation is now given referring to FIG. 5 wherein FIG. 5A gives a schematic diagram of plural control programs to be recorded, FIG. 5B shows a schematic diagram of a control program, FIG. 5C is a schematic diagram of a compound command, and FIG. 5E gives a schematic diagram showing an example of control programs recorded in the user data part 414.

The plural control programs are provided with a format shown in FIG. 5A, and each control program is divided by a SYNC code (11111111) of one byte, and the termination of control program is manifested by a train of recording of separator codes in the SYNC code. A disk ID code is recorded in the top control program, and the operation codes and their corresponding compound codes are recorded in the control programs other than the top control program.

The ID and operation codes are explained referring FIG. 5B. The disk ID code is formed of two bytes, and disk proper unique numerals are allocated for this. This code corresponds to the disk ID code in the barcode printed on the barcode memory medium. This disk ID code is utilized to establish a proper correspondence between optical disk 1 which is a combined memory medium and barcode memory medium 8.

When the barcodes of a memory medium which lack correspondence to the optical disk 1 set in the optical disk playback apparatus are read, the playback apparatus excludes erratic operations, and issues a warning of the wrong combination of optical disk 1 and barcode memory medium 8.

The operation code comprises two bytes which correspond to the operation code recorded in the barcode. When a barcode is read out of said barcode memory medium 8, a control program having an operation code corresponding to the operation code recorded in said barcode is selected, and the compound command contained in the selected control program is executed.

As shown in FIG. 5C, the compound command comprises more than one control command each of which is partitioned by a separator code of one byte. As shown in FIG. 5D, the control command is formed essentially of a control code of one byte and a succeeding attribute code of one byte. Some of the control command possess an additional one or two frame codes succeeding the above mentioned attribute code, and these control commands define the control operations of a minimum unit for the playback apparatus.

The control codes are allocated for the playback operations of the optical disk playback apparatus, or more concretely, are assigned for the commands for playback starting, playback ending, pause, search, multi-speed playback, etc. The detail of the attribute codes is prepared for each control code, and the operations to be executed accompanying the execution of the control code are defined. For example, those include the designation of audio channel, ON/OFF of audio output, ON/OFF of video output, etc.

The playback speed is also defined by the attribute code commanding multi-speed playback. A frame number which gives the address of an analog video signal for the optical disk 1 is recorded in the frame code, and the recording of said frame number is conducted at an accuracy of 1/30 second in the optical disk 1, with the required number of frame codes being different depending on the type of control code. For example, if the control code is a playback command, two frame code types including the playback starting frame code and playback ending frame code are recorded; if the control code is a search command, one type of frame code aimed for conducting the search is recorded. If the control code is a control operation which does not require frame code such as the playback ending command, the frame code is not recorded.

The above described plural control programs are divided into 12 bytes units from its top, and those are recorded in the user data part 414 in the pack. This is shown in FIG. 5E in various code levels.

Figure 6B:
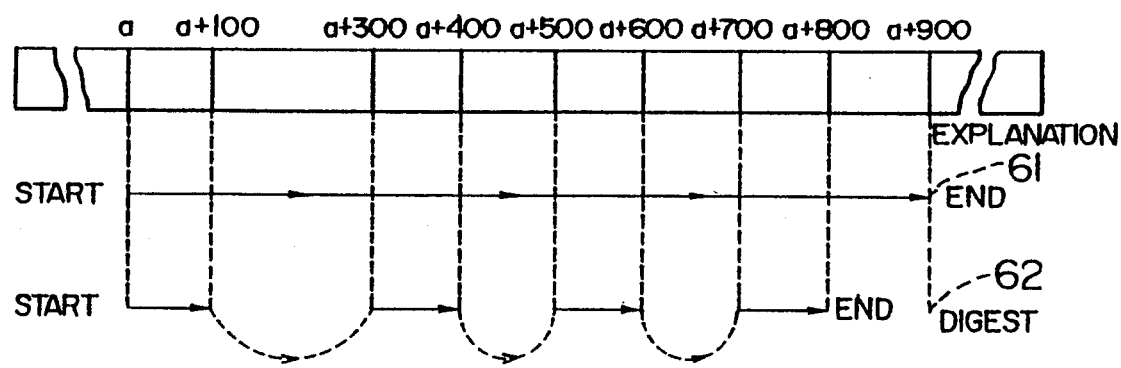
FIG. 6B shows a structure of program information stored in the optical disk of the first embodiment.

The barcode memory medium 8 on which the barcodes are recorded is explained referring FIG. 6A and FIG. 6B, and the present explanation is made taking as an example a case where said barcode memory medium 8 is an animal encyclopedia. FIG. 6A shows a spread of one page of said animal encyclopedia, FIG. 6B is a construction of program information recorded in an optical disk 1 together with its frame numbers. Said barcode memory medium 8 is an animal encyclopedia, and FIG. 6A shows a page spread showing a lion. The numerals 61 and 62 designate the barcodes wherein the ID and operating codes are recorded.

The disk ID code is a unique number specifying the correspondence between barcode memory medium 8 and optical-disk 1. The operation code constitutes numbers to specify a particular operation program among plural control programs recorded in the optical-disk 1. 61 is the barcode instructing the playback of "lion outline", and 62 is the barcode instructing the playback of "short highlight" by which the lion outline of lion is played back within a period shorter than that of 61. The optical-disk frame numbers of each program information instructing the playback by the barcodes 61 and 62 are shown in FIG. 6B. The content of "lion outline" indicated by the barcode 61 is recorded in the frames numbered from a to a+900. The content of "short highlight" indicated by the barcode 62 is excerpted from the program information for the "lion outline", and is recorded in the four frames each numbered by the numbers of a to a+100, a+300 to a+400, a+500 to a+600, and a+700 to a+800 respectively. The control programs selected by the operation code recorded in the optical-disk are defined as follows in the examples of "lion outline" and "short highlight".

The operating code expressed by the barcode 61 is defined by a compound command consisting in one control command reproducing the frame number a to a+900 among corresponding control programs, and the operation code expressed by the barcode 62 is defined by a compound command consisting of four control commands reproducing the frames with frame numbers of a to a+100, a+300 to a+400, a+500 to a+600, and a+700 to a+800 respectively among corresponding control programs.

The playback command instructed by the barcode 62 is far more complicated than that instructed by the barcode 61. However, the barcode 62 of which amount of information is the same as that of barcode 61, can execute the operations far more complicated than that of barcode 61 by giving the operation codes by means of barcodes and by recording the corresponding control programs on the optical-disk.

The formats of ID and operation codes recorded in terms of barcode are explained by referring to FIGS. 7A and 7B. FIG. 7A shows a schematic diagram of data recorded in a barcode form, and FIG. 7B shows a barcode module correlation showing correlation between the number indicated by each character and the module having a barcode pattern corresponding to a character. The barcode employed is a barcode taking into account the standard of UPC code. The barcode employed in this embodiment consists of 12 characters along the UPC standard code, and each character consists of 7 modules as shown by FIG. 7B.

The module represents the black bar by 1 and white by 0, and any one character is represented by a combination of 7 modules in the decimal system using numerals 0 to 9. The first character is assigned for the character number, the characters from the second to sixth are assigned for the disk ID codes, the characters from the seventh to eleventh are assigned for the operation codes, and the 12th character is utilized as the check digit.

The disk ID codes are unique numbers determined by the disk software such as the animal, human, or plant encyclopedia, and is used for preventing wrong combinations between barcode memory medium 8 and optical-disk 1. The operation code is a code necessary to select one particular program out of plural control programs recorded on the optical-disk 1. The check digit is for the detection of error which might happen at the barcode scanning.

Figure 8:
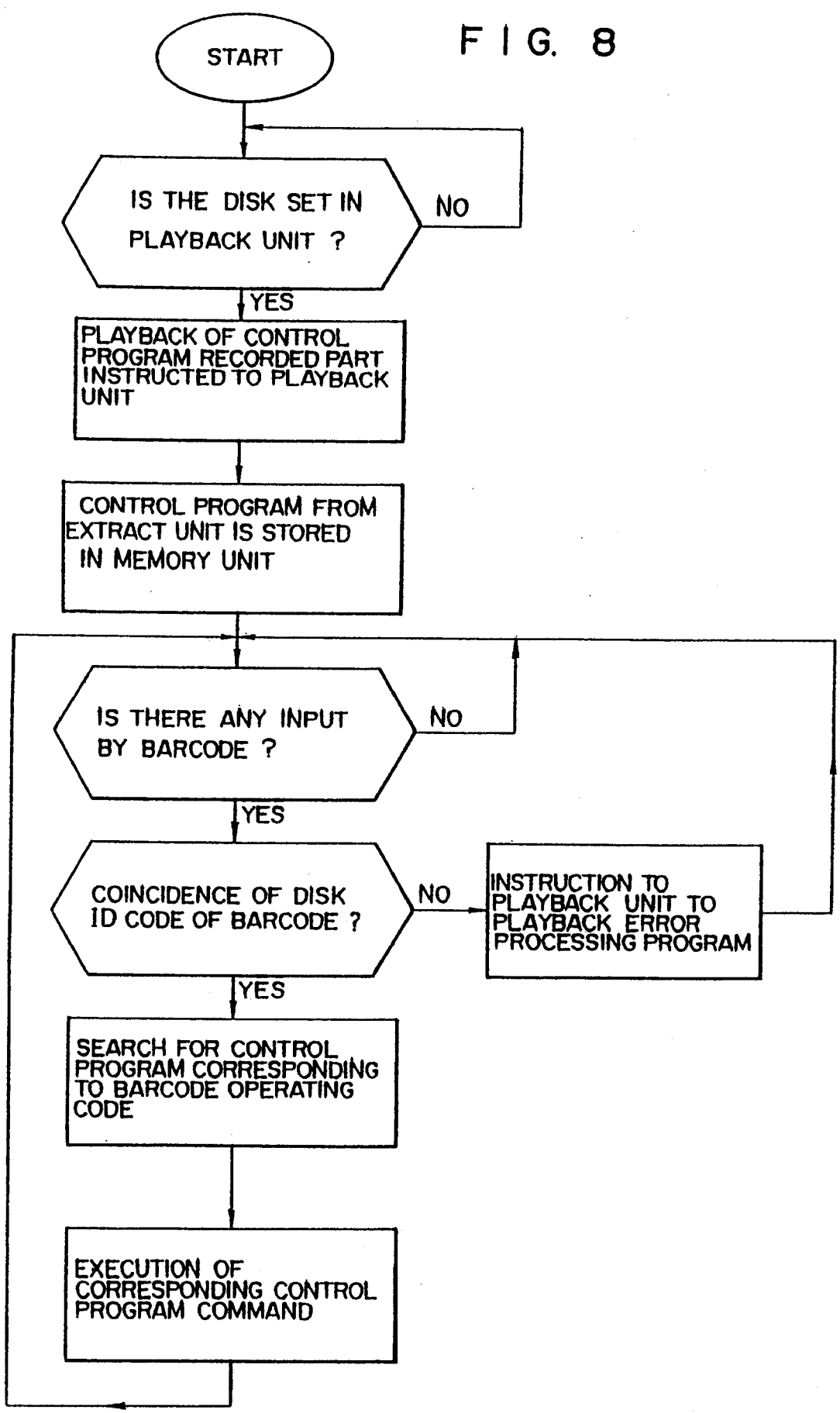
FIG. 8 is a flowchart showing the operations of a control unit of the first embodiment.

The details and operations of elements constituting the optical-disk playback apparatus are explained below by referring to FIGS. 1, 2, and 8. FIG. 1 is a block diagram showing the functions of optical-disk playback apparatus, and its details are given in FIG. 2. FIG. 8 is a flowchart showing the operation of control unit 5. The playback unit 2 includes a pick-up 20, preamplifier 21, address decoder 22, motor 23, and a controller 24.

The individual operation of each constituting element of playback unit 2 is as follows. The pick-up 20 projects laser light on the optical-disk for retrieving the information recorded therein as the playback signal d1 which is amplified and output by the preamplifier 21. The motor 23 drives the optical-disk 1. The demodulated video playback signal d11 is input to the address decoder 22 for extracting and outputting the frame number information d40 which is an address information of optical-disk 1 recorded in superposed on the video playback signal d11. The controller 24 is a one-chip microcomputer. The spindle servo is applied to the motor 23 according to both the frame number information output from the address decoder 22 and the control information d32 output from the control unit 5, and the tracking servo and focus servo are applied to the pick-up 20 which is traversed for the playback of optical-disk 1.

Explanations is now given of the above described constitution of playback unit 2 which plays back the designated part of optical-disk 1 by the control information d32 derived from the control unit 5. The amplified playback signal d2 is output from the preamplifier 21, and the detection of an assigned location on the disk is conducted by detecting the frame number contained in the analog video signal d11.

As shown in FIG. 2, the extraction unit 3 is constituted of MTF25, LPF26, LPF27, BPF28, BPF29, BPF210, data-slicer 211, EFM demodulating circuit 212, selector 213, and a data decoder 214. The individual functions of the elements constituting said extraction unit 3 are as follows. MTF25 is for the MTF (modulation-transfer-function) compensation, and it controls the gain of AGC (automatic gain control) circuit for compensating the difference of amplitudes of playback signal d2 which takes place between the outer and inner rims of the optical-disk.

The LPFs 26 and 27 are the low-pass filters. LPF27 is to pass the frequency components below 3 MHz for removing the analog-video signal out of playback signal d3. LPF26 is to pass the frequency components below 2 MHz for removing the signal components other than the digital audio components out of playback signal d2. The BPFs 28, 29, and 210 are band-pass filters, and BPF29 is to pass the frequency components within 2.3 MHz±100 KHz. BPF 210 is for 2.8 MHz±100 KHz for obtaining two channel analog audio components d6 and analog audio component d7 respectively. BPF28 is to pass the frequency components within 3.5 to 15 MHz for obtaining the analog video signal component d5. The data-slicer 211 is to obtain the binary expression of playback signal d14.

The EFM demodulator 212 conducts EFM (eight to fourteen demodulation) after the synchronism detection of input signal d15 in binary expression for transforming it into a digital data train d16 which is further input to the selector 213 where it is divided into the time-divisioned main channel data d17 and the sub-channel data d36 for output.

The sub-channel data d37 is input to the data-decoder 214 where the synchronism and error detections and error correction of R-W channels are carried out. Furthermore, considering the command and instruction data for each pack, it outputs plural control programs recorded in the user data part 414 in the pack where the termination bit is indicated among the packs which show the starting bit of instruction data and its command data takes the mode 7 and item 0.

The operations of extract unit 3 constituted as described above are as follows. The playback signal d2 from the playback unit 2 is input to the extraction unit 3 where the analog video component is extracted through MTF25 and BPF28, two channel analog audio components are extracted through MTF25, LPF27, BPF29 and BPF210, and the digital audio component is extracted through LPF26 for output. Said analog video component d5 and two channel analog audio components d6 and d7 are output directly from the extract unit 3.

The digital audio component d14 is transformed into its binary expression in the data-slicer 211, and is demodulated into a digital data train d16 by the EFM demodulating circuit 212. This data train d16 is further divided into a main channel data d17 and sub-channel data d37 in the selector 213 for output. The main channel data d17 among the digital data train d16 is directly output from the extract unit 3. Plural control programs are extracted from the sub-channel data d37 among the digital data train d16 in the data-decoder 214, and these extracted plural control programs are output from the extract unit 3.

As shown in FIG. 2, the processing output unit 6 consists of the FM demodulating circuits 215, 216, 217, de-emphasis circuits 218, 219, 220, SW blocks 225, 226, 227, EDC.ECC circuit 221, D/A 222, and LPFs 223 and 224. The following are explanations of the individual elements constituting the processing output unit 6.

The FM demodulating circuits 215, 216, and 217 conduct the frequency demodulation of input signals d5, d6 and d7. The de-emphasis circuits 218, 219, and 220 conduct the reduction of noise produced by said modulation and demodulation. The EDC.ECC circuit 221 conducts the error detection and correction process on the main channel data d17, and it outputs 16 bit digital audio data d18. D/A 222 conducts the digital to analog conversion. LPFs 223 and 224 pass through the audio components below 20 KHz of input signals d19 and d20 respectively. SW blocks 225, 226, and 227 are switches and operate the ON/OFF of output according to the control signals d23, d24, and d25 derived from the control unit 5.

The operations of said processing output unit 6 of above described constitution is as described below. The processing output unit 6 conducts the signal processing shown below on the playback signal components other than the control programs. As for the analog video component d5, it is demodulated by the FM demodulating circuit 215, and its noise reduction processing is conducted in the de-emphasis circuit 218 before it is externally output as an analog video signal through the SW block 225.

The two channel analog audio components d6 and d7 are demodulated by the FM demodulating circuit 216 and 217 respectively, and their noise levels are reduced in the de-emphasis circuits 219 and 220 respectively before these are externally output as analog audio signals through the SW block 226.

As for the main channel data d17, the error detection and correction process thereof is conducted on it in the EDC.SCC circuit, and the digital to analog conversion thereof is conducted in the D/A 222 for converting it to two channel analog audio signals d19 and d20 of which high-band noise is reduced through LFFs 223 and 224 before these are output. Furthermore, the SW block 225 conducts the analog video signal ON/OFF, the SW block 226 conducts the analog audio signal output ON/OFF, and the SW block 227 conducts the ON/OFF of analog audio signal output played back from digital audio data recorded on the optical-disk. These ON/OFF controls are conducted obeying the instructions given by the control unit 5.

The constituting elements of barcode read unit 7 and the operation thereof is as the following. The light emitted from a light emitting diode housed in the barcode sensor 234 is projected on the printed barcode to obtain its reflection which is detected by a light detecting device where the barcode stripe pattern is transformed into light intensity variations which are eventually transformed into electrical signals of barcode for output.

The electrical output signal from the barcode sensor 234 is amplified by the digitizer 235 and is converted into a digital signal d34 in reference of a threshold value. Said digital signal d34 output from the digitizer 235 is converted into the binary ID and the operation codes, and error detection and correction are conducted thereon. These are stored in the register 237 if found to be normal.

The memory unit 4 is a random access memory (RAM), and is connected to the internal bus d30 of control unit 5 for storing the plural control programs derived from the extract unit 3 through the input buffer 229. As shown in FIG. 2, the control unit 5 consists of a micro-processor 232, ROM 228, input buffers 229 and 230, I/O buffer 231, and the output latch 233 connected through a bus line.

The following explains the individual constituting elements of control unit 5. The microprocessor 232 is an 8 bit microprocessor. ROM 228 is a read-only memory connected to the internal bus d30, and the executing programs being executed by said microprocessor are stored therein.

The input buffers 229 and 230 constitute a parallel port connected to the internal bus d30, and execute the buffering of input data. The I/O buffer 231 is a serial port, and is connected to the internal bus d30 for conducting the buffering of I/O data. The I/O buffer 231 conducts a parallel to serial conversion (P.S. conversion) of the control information transmitted from the microprocessor 232 to the controller 24, and conducts a serial to parallel conversion (S/P conversion) of the status information sent from the controller 24 to the microprocessor 232. The output latch 233 is an 8 bit output latch connected to the internal bus d30, and uses only the upper three bits.

The operation of control units 5 thus constituted is as follows. When an optical-disk 1 is set in the playback apparatus, the microprocessor 232 supplies control information to initiate the playback from the lead-in part 31 through the buffer 231. When the plural control programs extracted from the extract unit 3 are given to the control unit 5 through the data decoder 214, the microprocessor 232 transmits the control program to the memory unit 4 through the input buffer 229 and the internal bus d30. The control program is a combined command including plural commands to indicate an operation of the optical-disk playback apparatus, such as play, pause, seek, search and mute.

On the other hand, when the barcode is read in the barcode read unit 7, the microprocessor 232 reads out the operation codes stored in the register 237 in the barcode read unit 7 and the ID codes through the input buffer 230. Since these cedes are of BCD code, the microprocessor 232 converts these into the corresponding binary code of 16 bits.

The microprocessor 232 then compares the converted disk ID codes to the disk ID codes stored in the memory unit 4. If a discrepancy is found between these two, the microprocessor 232 cancels the input made by said barcode. If these coincide, the corresponding control programs are read from the plural control programs stored in the memory unit 4, and the compounds command defined by said control programs are sequentially executed. More specifically, the control information d32 is output through I/O buffer 231 for the playback unit 2, and the control signals d23, d24, and d25 which instruct ON/OFF to each corresponding switch blocks are output through the output latch 233 for the processing output unit 6.

The operation of an optical-disk playback apparatus of this embodiment comprising an optical-disk 1, playback unit 2, extract unit 3, memory unit 4, control unit 5, processing output unit 6, barcode read unit 7, and barcode memory medium 8, is as follows.

The playback unit 2, upon detecting the setting of optical-disk 1 in the playback apparatus by an optical-disk detector which is not shown, informs this as a status information to the control unit 5 through the signal line 32. The control unit 5 outputs a control command to instruct the playback of lead-in part 31 of optical-disk 1 to the playback unit 2 which starts the playback of optical-disk 1.

Since no meaningful audio and video information is recorded in the lead-in part 31, the video and audio information is muted in the processing output unit 6. Since a plurality of control programs are recorded in the digital audio data sub-channel which is reproduced in the lead-in part 31, said plural control programs are extracted from the playback signal by means of the extract unit 3, and this is transferred to the memory unit 4 by means of the control unit 5 and stored therein.

At the point of the read-out ending of the control program, the program area 32 is played back under the instruction made by the control unit 5, and predetermined processings are conducted for each of playback signals in the processing output unit 6, for producing output audio and video information.

In this playback, of the optical-disk software which is an animal encyclopedia, and the video and audio information giving the instructions for operating said playback unit by barcodes, are given. At the ending of operation instruction, the playback apparatus is paused, and turned into a waiting condition for another barcode input by the user. Thus, in this condition, the barcodes recorded in the barcode memory medium 8, and consistent with the optical disk 1 set in the optical-disk playback apparatus, become executable. That is, the playback of optical-disk 1 becomes controllable by the barcode commands made by the user.

When a user, as he is looking into a barcode memory medium 8 which is an animal encyclopedia, traces the barcode printed on a side of explanations by a barcode reading unit 7, the traced barcode is transformed into an ID code and operation code in the barcode reading unit 7, and these are transmitted to the control unit 5.

The ID code and operation code are compared with the stored disk ID code and control program in the control unit 5. If a discrepancy exists, the cancellation of barcode input is conducted, and a program information for error processing at the optical-disk 1, e.g., a message stating "This disk is an animal encyclopedia, please input the correct barcode" is sent to the playback unit 2 which displays this message.

When a coincidence of both disk ID codes is obtained, the control unit 5 retrieves the control program corresponding to the operation code out of plural control programs and executes the compound command of control programs having a corresponding operation code. The execution of compound command is performed by the sequential executions of control commands constituting said compound command. The control unit 5, as it executes said control commands, outputs control information to the playback unit 2 if it is a control operation to the playback unit 2, and outputs control information to the processing output unit 6 if it is a control operation to the processing output unit 6.

The playback unit 2 receives the control information, plays back the optical-disk 1 according to said control information, and processing output unit 6 turns ON/OFF of video and audio information according to the input control information.

In an example of barcode 62, the operation code and disk ID code are read by the barcode reading unit 7, and these codes are transferred to the control unit 5 where the received operation and disk ID codes are compared with the stored disk ID codes for coincidence and reproduces the error processing program if any discrepancies are found. If a coincidence between these two ID codes is found, control programs corresponding to the operation codes read by the barcode reader is retrieved from plural control programs stored in the memory unit 4 by the control unit 5.

The compound command to be stored in the control programs corresponding to the barcode 62 consists of four control commands which are sequentially executed, and its first command is a playback command for the starting frame a to the ending frame a+100, and the second control command is for the starting frame a+300 to the ending frame a+400. The third command is for the starting frame a+500 to the ending frame a+600, and the fourth command is a command for the starting frame a+700 to the ending frame a+800.

After the first control command is executed at first, the control unit 5 instructs the playback unit 2 to playback the part from the starting frame a to the ending frame a+100. The playback unit 2 starts playback of optical-disk 1 from the frame number a according to the control information, and the playback signal derived from the playback unit 2 is transformed into the audio and video information which are output externally through processing output unit 6. As the playback unit 2 monitors the frame number of the playback signal, the playback is terminated when the frame number a+100 is detected.

The control unit 5 recognizes the ending of playback by receiving a status information, and executes the second control command. That is, it instructs the playback unit 2 to playback the part from the starting frame a+300 to the ending frame a+400. Thus, the playback unit 2 starts playback from the frame number a+300 and ends the playback at the ending frame a+400. The third command and the fourth command are executed in a similar manner.

At the ending of the fourth control command execution, the playback apparatus is brought into a pause condition for preparing for another barcode input by the user. The above described operations of control unit 5 will be better understood by a flowchart of control unit 5 shown in FIG. 8.

According to the above described embodiment, any person who prepares the disk-software can define a barcode system by which the operation thereof can be specified, and by interpreting the read barcodes by the barcode reading unit 7 by using said particular software control programs recorded in the optical-disk 1, the operations depending on an individual disk becomes executable. Furthermore, since plural control commands can be allocated for one barcode, complicated and various operations of the apparatus can be realized very easily without requiring increased barcode information such as employments of an elongated barcode or the reading of plural barcodes.

Further, even if a wrong combination of compound memory medium consisting of barcode memory medium 8 and optical-disk 1 is attempted, so far as a correlation is found between the barcode of barcode memory medium 8 and the control program recorded in the optical-disk 1, the playback apparatus suspends the operation of playback unit 2, and meaningless play-back for the user can be prevented. A second embodiment of an optical-disk playback apparatus, a method of optical-disk playback, and its combined memory medium of the present invention are as follows referring to the accompanied drawings. This is an embodiment wherein the succeeding operation codes for read are interpreted by the control programs recorded in the optical-disk, once a specific escape code is read.

Since the block diagram of this optical-disk playback apparatus, and the optical-disk frame, sub-code frame, control program contained in the optical-disk, and control program for the pack, compound command, control command and barcode module are identical with those of the first embodiment, explanations thereof are omitted here.

Figure 6C:
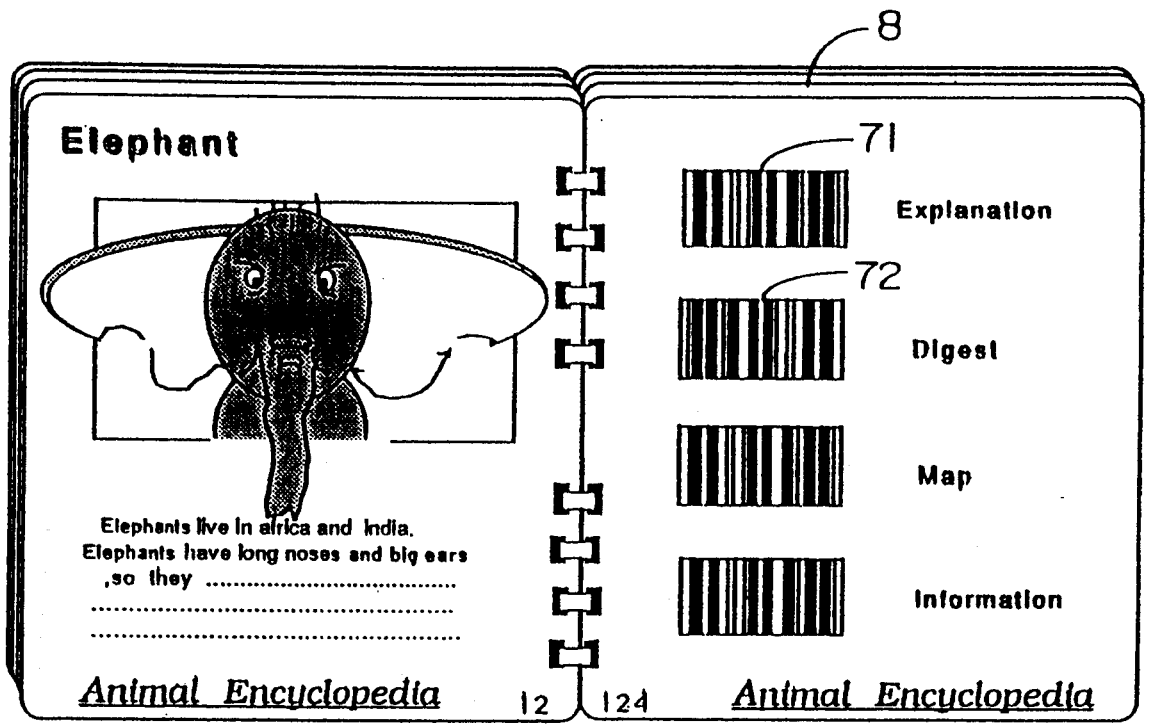
FIG. 6C shows a spread of a book on which barcodes of a second embodiment are printed.
Figure 6D:
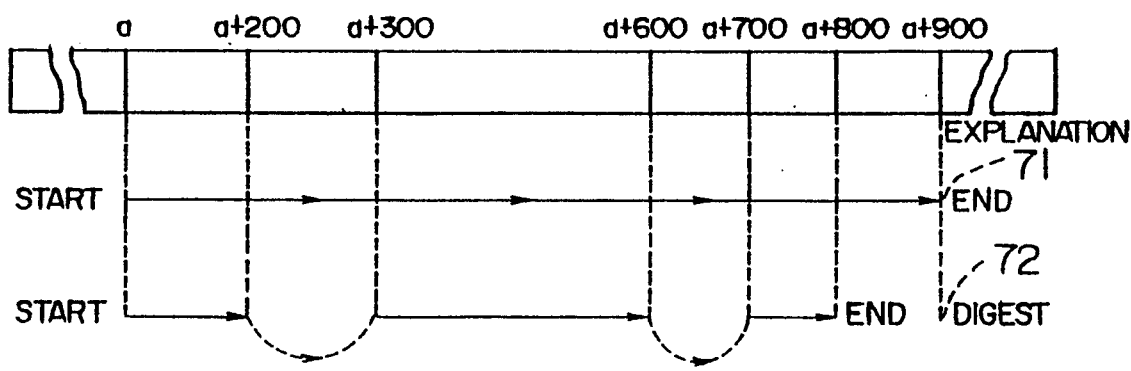
FIG. 6D shows a structure of program information stored in the optical-disk of the second embodiment.

FIG. 6C shows a page spread of an animal encyclopedia which is a barcode memory medium of this embodiment, and FIG. 6D is a diagram of program information constitution recorded on the optical-disk 1 together with these frame numbers. The barcode memory medium 8 is an animal encyclopedia, and FIG. 6C shows a page containing information relating to elephants. 71 and 72 are barcodes, and the operation code A is recorded in the barcode 71. The escape code is recorded at the location of character number shown in FIG. 7A, and the disk ID code and operation code B are recorded thereafter.

The disk ID codes, as shown by the first embodiment, are unique numbers employed to specify the correlation between the barcode memory medium 8 and optical-disk 1. The escape codes are the playback apparatus proper codes independent of the optical-disk to be played back, and are common codes between different optical-disk playback apparatus, such those simple commands of playback, playback ending, pause, search, multi-speed playback, etc. which should have been prepared by the playback apparatus itself. The escape code is utilized to switch the control programs which is to correlate the input operation code to the operation of apparatus between the plural control programs recorded in the optical-disk 1 and the apparatus proper control program independent of the content of the optical-disk.

That is, the interpretation is normally conducted by using the apparatus proper control programs independent of the content of the optical-disk to be reproduced, but, once the escape code is detected, the operation code recorded in the same barcode for the escape code switches the retrieval of corresponding control programs to the control programs recorded in the optical-disk.

There are two types of operation codes, i.e. operation codes A and B. The operation code A is a code to be interpreted by an apparatus proper control program independent of predetermined optical-disk contents to specify an apparatus operation. The operation code A is comprised of a control code to define the playback operation, etc., and a frame code attached to said control code. In a case of a control code without requiring the frame code, "no operation" which specifies nothing to be done is recorded in place of said frame code.

The operation code B is a code to specify a particular control program out of plural control programs recorded in the optical-disk 1. 71 is a barcode to specify the playback of "elephant outline", and 72 is a barcode to instruct the playback of "short highlight" wherein the elephant outline is reproduced in a period much shorter than that for the barcode 71.

The frame numbers of each program information to be played back by barcodes 71 and 72 on the optical-disk 1 are shown in FIG. 6D, thus the contents of "elephant outline" corresponding to the barcode 71 are recorded in the area from frame number a to a+900. The contents of "short highlight" corresponding to the barcode 72 consists of the parts included in the program information of "elephant outline", and these are recorded in three parts with frame numbers of a to a+200, a+300 to a+600, and a+700 to a+800.

The control program selected by the operation code is defined as follows as for the examples of "elephant outline" and "short highlight". The operation code A represented by the barcode 71 consists of a control code to specify the playback operation and two frame codes having frame numbers a and a+900. Moreover, since an escape code is recorded at the first position of the barcode 72, the following operation code B is selected out of the control programs recorded in the optical-disk. The operation code B is defined to as a compound command consisting of three control commands for playbacks of the frame numbers a to a+200, a+300 to a+600, and a+700 to a+800 among corresponding control commands.

When an optical-disk of this embodiment is played back in a conventional optical-disk playback apparatus of which operations corresponding to each of barcodes are fixed, the "elephant outline" can be reproduced since its operation code is the one defined within the predetermined control programs proper to the playback apparatus and independent of the content of the optical-disk.

Moreover the, "elephant outline" can be naturally played back when playback is conducted by using an optical-disk playback apparatus of this embodiment, and if the playback of "short highlight" is instructed by the barcode 71, the control program is switched to playback "short highlight" by means of said escape code. As described above, by recording the escape code, the interchangeability between the combined memory medium of the second embodiment and the conventional optical-disk playback apparatus can be accomplished.

The formats of disk ID code and operation code to be recorded as the barcodes are explained referring to FIG. 7A.

The barcodes conforming to the standard of UPC codes are used in this case. The barcode of this embodiment consists of 12 characters like the UPC standard code. FIG. 7A is a schematic diagram of data recorded as a barcode wherein the first character shows the character number. In this embodiment, the escape code to select the control program is recorded on its character number position.

When the first character is an escape code, the characters from the second to sixth are utilized as the disk ID code, and the characters from the seventh to eleventh are utilized as the operation code B. The twelfth character is utilized as a check digit.

When the first character is not an escape code, the characters from the second to eleventh are utilized as the operation code A (not shown), and the twelfth character is utilized as a check digit.

The disk ID code is a unique number determined by the types of disk-software such as animal, human body, and plant encyclopedia, and is to prevent erratic operations when an umatched combination of barcode memory medium 8 and optical-disk 1 takes place.

The operation code A is a code to be interpreted by an optical-disk playback apparatus proper predetermined control program independent of the content of the optical-disk. The operation code B is a code required to select a desired program among plural control programs recorded in the optical-disk 1. The check digit is used for error detection at the reading of barcodes.

The details and operations of the elements constituting an optical-disk playback apparatus are explained referring to FIGS. 1, 2, and 9. FIG. 1 is a schematic diagram showing the functions of optical-disk playback apparatus and, FIG. 2 shows details of FIG. 1. FIG. 9 is a flow-chart showing the operation of control unit 5 of this embodiment. Since the constituting elements of each unit, and the operation thereof except those of control unit 5 are identical with those of the first embodiment, these are omitted here.

Control unit 5 of this embodiment operates as follows. When an optical-disk 1 is set in the playback apparatus, the microprocessor 232 outputs a control information to start the playback from the lead-in part 31 through the I/O buffer 231 for the playback unit 2.

When the plural control programs extracted by the extract unit 3 are input to the control unit 5 from the data-decoder 21, the microprocessor 232 sends out control programs to the memory unit 4 through the buffer 229 and internal bus d30.

Meanwhile, when the barcode is read at the barcode read unit 7, the microprocessor 232 reads out the character number, operation code, and disk ID code stored in the register 237 of barcode read unit 7 through the input buffer 230, and since these codes are BCD codes, the microprocessor 232 converts these codes into binary numbers of 16 bits.

The microprocessor 232 then judges if the converted character numbers indicates the escape code or not, and if not, the reference to the control programs proper to the optical-disk playback apparatus stored in ROM 228 is made, and the command corresponding to the operation code succeeding to said control program is executed.

If the character number is an escape code, a comparison between the disk ID code and disk ID code stored in the memory unit 4 is conducted, and if these are different, the microprocessor 232 cancels the input made by the barcode. If these coincide, corresponding control programs are selected out of the plural control programs stored in the memory unit 4, and the compound command defined by said control programs is executed, or the plural control commands constituting the compound command are sequentially executed.

More specifically the control information d32 is given to the playback unit 2 through the I/O buffer 231, and for the processing output unit 6, the control signals d23, d24, and d25 which instruct ON/OFF to each switch block through the output latch 233 are given.

The above described operation of control unit 5 in the optical-disk playback apparatus of this embodiment is illustrated by the flowchart of control unit 5 shown in FIG. 9.

According to this embodiment, by using the escape code, a barcode operable by the apparatus proper control program independent of the optical-disk content and predetermined by the optical-disk playback apparatus itself and a barcode operable by the control program recorded in the optical-disk can be simultaneously recorded on a single barcode memory medium 8, and by this, the combined memory medium of this embodiment can be played back by the conventional optical-disk play-back apparatus of which operations corresponding to the barcodes are fixed within the apparatus, attaining the interchangeability of optical-disks.

In addition, while the above explanation relates to an optical-disk 1 which is an LV disk of a CAV system in both the first and second embodiments, the scope of this invention is not limited to any particular type of optical-disks so far as the disks are capable of recording audio, video, or both. For example, the invention is applicable to a CD on which only digital audio data is recorded a, compact video-disk (CD-V) which is capable of recording the digital audio data and analog video data, an LV of CLV system, and a write-once (W/O) disk.

Since the recording is made at a constant speed for the LVs of CD-V or CLV systems, a frame memory which could be incorporated in the processing output unit 6 is necessary for reproducing still pictures. Whereas the control programs are stored in this playback apparatus of this embodiment preceding the playback of the program part 32 when an optical-disk is set in the apparatus, the storing of control programs preceding the playback of program part 32 is not essential, and an alternative is that the playback of the part wherein the control program is recorded may be executed whenever a barcode is input in this case.

Moreover, whereas the lead-in part 31 is assigned as a physical location on which the control programs are recorded on the optical-disk in this embodiment, the physical location of the control programs is not limited to this location, and, for example, it can be recorded on the lead-out part 33 or the program part 22.

Furthermore, as the control programs are recorded as a sub-channel data of digital audio signal in this embodiment, the recording signals are not limited to the above, and for example, the lower bit of digital audio data can be substituted by the control programs, or it can be recorded as a Manchester code during a vertical blanking period of analog video signals.

Although compound memory medium is described in the context of an animal encyclopedia in this embodiment, uses are not limited to this application, but the invention is applicable to other encyclopedia such as for the plants, merchandise catalogs, teaching materials, entertainment materials, and various other purposes.

As an example of teaching materials, language learning can be made highly effective by utilizing a CD and barcode system. That is, a foreign language C such as French or German, sentences and corresponding barcodes are printed and recorded on a barcode memory medium 8 and CD respectively, and the desired audio information recorded on said CD can be easily retrieved by a user by simply tracing a corresponding barcode printed on said barcode memory .medium by a barcode read unit 7.

Although only printed barcode patterns consisting of only black and white module are shown in this embodiment, the type of barcode is not limited to this, but a barcode pattern printed by ink legible only by infrared rays can be also used. Since the barcode is invisible to the naked eye, it can be highly effective to construct a textbook layout, and can be used for preparing attractive memory medium 8.

We claim:

1. A combination of an optical-disk, a barcode memory medium, a barcode reader and an optical-disk playback apparatus, said optical-disk for being set in the optical-disk playback apparatus and having information recorded thereon including data and plural control programs specifying playback operations of said optical-disk playback apparatus for playing back said data recorded on said optical-disk;

said barcode memory medium having barcodes recorded thereon for being read-out by said barcode reader which is electrically connectable to said optical-disk playback apparatus, each of said barcodes including an operation code corresponding to one of said plural control programs specifying one of said playback operations of said optical-disk playback apparatus; and said optical-disk playback apparatus comprising means, responsive to selection of one of said barcodes via said barcode reader, for selecting a corresponding playback operation among said playback operations that corresponds to said one of said barcodes and playing back said data recorded on said optical-disk in accordance with said corresponding playback operation.

* * * * *